Patented Aug. 16, 1927.

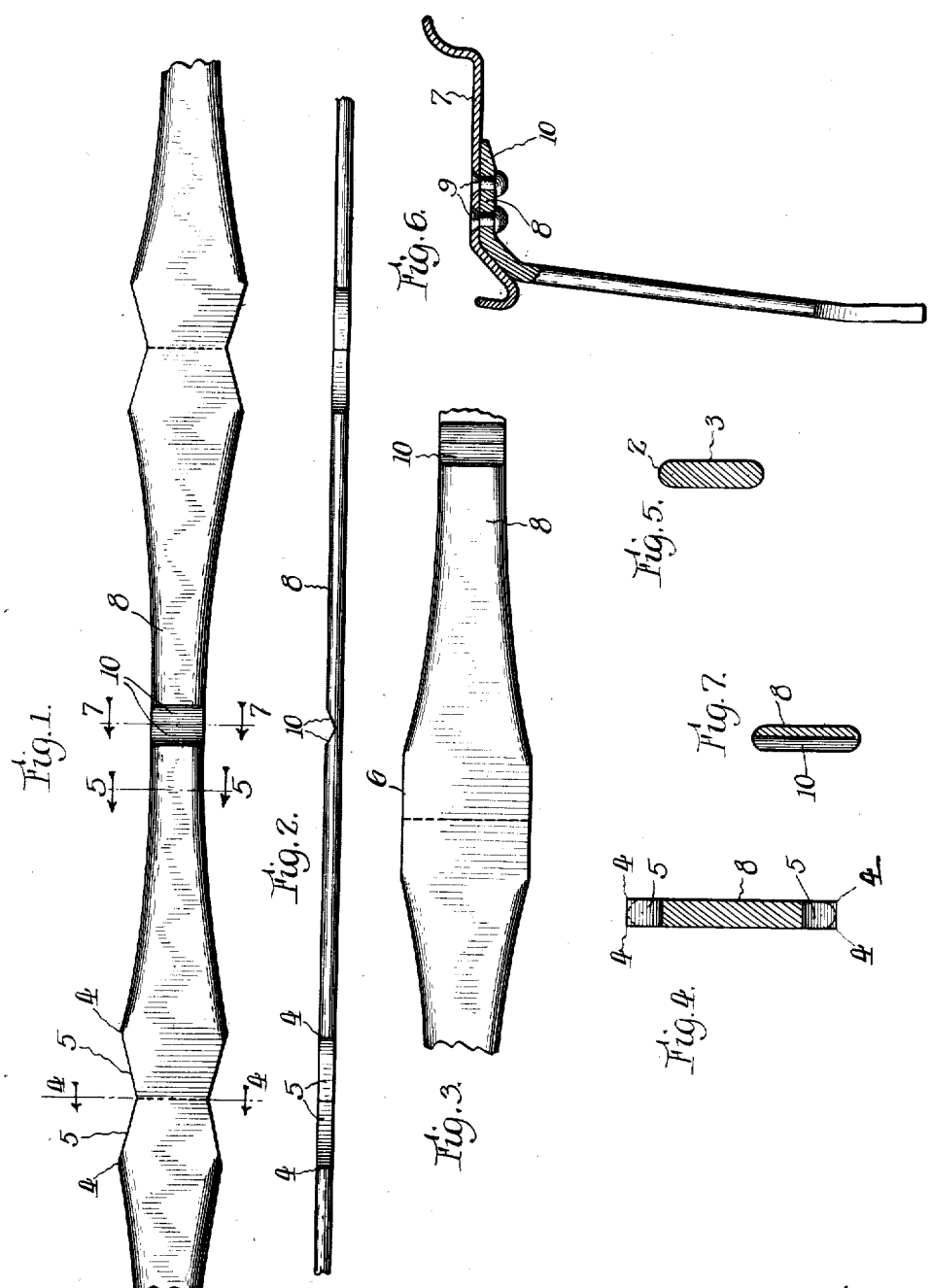

1,639,068

UNITED STATES PATENT OFFICE.

WILLIAM ERASTUS WILLIAMS, OF WILMETTE, ILLINOIS, ASSIGNOR TO AMERICAN STEEL FOUNDRIES, OF CHICAGO, ILLINOIS, A CORPORATION OF NEW JERSEY.

WHEEL-SPOKE BAR.

Application filed January 19, 1925. Serial No. 3,278.

My invention relates to a bar of steel rolled especially for the purpose of being fabricated into spokes for steel automobile wheels and other wheels and the object of the invention is to provide a desirable form of spoke rolled in a bar that may be cut into the desired lengths for fabricating into spokes of wheels.

Reference will be had to the accompanying drawing in which Fig. 1 is a side elevation of my spoke bar.

Fig. 2 is an edge view.

Fig. 3 is a modified form of a bar.

Fig. 4 is a cross-section on line 4—4 of Fig. 1.

Fig. 5 is a cross-section on line 5—5 of Fig. 1.

Fig. 6 is a section through a portion of a wheel showing the spoke fastening to the rim.

Fig. 7 is a section on line 7—7 of Fig. 1.

The bar is rolled with the waist-like portion indicated by Fig. 5 having the rounded corners 2 and the flat sides 3. This section merges into the sections having the greatest width indicated by the points 4—4 at which points the rounded edges are merged into a flat surface.

From 4—4 the section narrows down still in rectangular form to the section line 4—4 in Fig. 1, thus providing the beveled or tapered surfaces 5—5 which form the segments which join each other around between the hub flanges.

The outer ends of the spokes or those portions which join the rim are tapered off on the flat sides as indicated by the flat surfaces 10 and when the spoke bar is cut into spoke lengths the severance of the bar is made at the section 7—7 of Fig. 1 thus providing the beveled ends 10 arranged as shown in Fig. 6.

The bar is cut up in suitable lengths into single spoke portions between the sections 7—7 and sections 4—4 forming individual spokes.

In Fig. 3 in place of the beveled surfaces 5—5 I provide a straight surface 6 which permits the spoke ends to be sheared as to their beveled ends in order to have the bevel properly arranged for use with a varying number of spokes in a wheel, as some wheels are made with 12 and some with 10 spokes, or less.

Thus by the form shown in Fig. 3 by shearing this bevel surface on each individual spoke this spoke may be fitted to a wider range than in the case where this bevel is rolled as indicated by 5—5 in Fig. 1.

However, the size of the bar at the sections 4—4 Fig. 1 may be sufficiently large as relates to the width or depth of the bar to also provide for varying widths of bar as assembled in the spokes thus permitting a shearing operation for the bevel surface to accommodate for the different number of spokes used in the wheel.

The greatest strain that is put upon a spoke of a fast moving vehicle such as the automobile, comes on the side skids and not as vertical loads and hence I provide my spokes with substantially uniform thickness providing for the varying leverage for varying the width, or rather the depth, as is indicated in Fig. 1.

These spokes are usually fastened to the rim in a manner indicated by Fig. 6 wherein the narrow end 8 of the spoke is turned over and riveted by rivets 9 to the rim 7.

Thus the tapered or beveled end 10 gives a smoother joint and is easier cleaned than were the spoke cut squarely off.

By making the spokes substantially uniform in thickness except at the end portions where the tapers 10 occur, I am able to roll a smoother spoke as relates to its edges and which requires less finish in the way of grinding, chipping and polishing than is possible to arrive at when the edges of the spokes are relatively thinner than the body of the spoke.

Where the tapered ends 10 occur there will be a slight fin on the edges which will be sheared at the time the bars are cut into individual spokes but this feature is not a material disadvantage.

What I claim is:

1. A new article of manufacture for use as spokes of wheels, composed of a bar of greater width than thickness and comprised of sections tapered as to width with substantially rectangular corners for relatively short portions of a bar, and sections oppositely tapered as to width with rounded corners for the major portions of the bar, in combination with a relatively short portion tapered as to thickness in the regions of the narrowest widths of the bar.

2. A new article of manufacture, composed of a rolled bar having portions of varying widths corresponding to the requirements of spokes for wheels, a portion of the bar having substantially rectangular corners for relatively short distances and relatively rounded corners for the major portion of the length, and substantially uniform in thickness through the major portion of the bar.

Signed at Chicago, in the county of Cook and State of Illinois, this 16th day of January, 1925.

WILLIAM ERASTUS WILLIAMS.

2. A new article of manufacture, composed of a rolled bar having portions of varying widths corresponding to the requirements of spokes for wheels, a portion of the bar having substantially rectangular corners for relatively short distances and relatively rounded corners for the major portion of the length, and substantially uniform in thickness through the major portion of the bar.

Signed at Chicago, in the county of Cook and State of Illinois, this 16th day of January, 1925.

WILLIAM ERASTUS WILLIAMS.

CERTIFICATE OF CORRECTION.

Patent No. 1,639,068.  Granted August 16, 1927, to

WILLIAM ERASTUS WILLIAMS.

It is hereby certified that the above numbered patent was erroneously issued to "American Steel Foundries, of Chicago, Illinois," a corporation of New Jersey, whereas said patent should have been issued to "Steel Wheel Corporation, of Lansing, Michigan," a corporation of Michigan, said corporation being assignee, by mesne assignments, of the entire interest in said invention, as shown by the records of assignments in this office; and that the said Letters Patent should be read with this correction therein that the same may conform to the record of the case in the Patent Office.

Signed and sealed this 18th day of October, A. D. 1927.

Seal.

M. J. Moore,
Acting Commissioner of Patents.

CERTIFICATE OF CORRECTION.

Patent No. 1,639,068. Granted August 16, 1927, to

WILLIAM ERASTUS WILLIAMS.

It is hereby certified that the above numbered patent was erroneously issued to "American Steel Foundries, of Chicago, Illinois," a corporation of New Jersey, whereas said patent should have been issued to "Steel Wheel Corporation, of Lansing, Michigan," a corporation of Michigan, said corporation being assignee, by mesne assignments, of the entire interest in said invention, as shown by the records of assignments in this office; and that the said Letters Patent should be read with this correction therein that the same may conform to the record of the case in the Patent Office.

Signed and sealed this 18th day of October, A. D. 1927.

Seal.

M. J. Moore,
Acting Commissioner of Patents.